(12) United States Patent
Hummel

(10) Patent No.: US 10,837,522 B2
(45) Date of Patent: Nov. 17, 2020

(54) DUAL CLUTCH TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 517 days.

(21) Appl. No.: 15/551,954

(22) PCT Filed: Jan. 20, 2016

(86) PCT No.: PCT/EP2016/051115
§ 371 (c)(1),
(2) Date: Aug. 18, 2017

(87) PCT Pub. No.: WO2016/131598
PCT Pub. Date: Aug. 25, 2016

(65) Prior Publication Data
US 2018/0245669 A1 Aug. 30, 2018

(30) Foreign Application Priority Data
Feb. 19, 2015 (DE) .......................... 10 2015 002 134

(51) Int. Cl.
*F16H 3/00* (2006.01)
*F16H 3/089* (2006.01)
*F16H 3/08* (2006.01)

(52) U.S. Cl.
CPC ............ *F16H 3/006* (2013.01); *F16H 3/089* (2013.01); *F16H 2003/0803* (2013.01);
(Continued)

(58) Field of Classification Search
CPC ..... F16H 2200/0078; F16H 2003/0826; F16H 3/006
See application file for complete search history.

(56) References Cited

U.S. PATENT DOCUMENTS 8,210,063 B2 * 7/2012 Tsukada ............... F16D 11/10
74/33
2017/0182996 A1 * 6/2017 Hose ..................... B60K 6/48
(Continued)

FOREIGN PATENT DOCUMENTS

CN 101398078 A 4/2009
CN 103711845 4/2014
(Continued)

OTHER PUBLICATIONS

Office Action dated Dec. 27, 2018 in corresponding Chinese Application No. 201680009882.5; 10 pages including English-language translation.

(Continued)

Primary Examiner — Terence Boes
(74) Attorney, Agent, or Firm — Maier & Maier, PLLC

(57) ABSTRACT

A dual clutch transmission for a motor vehicle, with gear wheel sets, which can be engaged via shift elements and which form exactly eight wheel planes, which are associated with respectively a first sub-transmission and a second sub-transmission. Each sub-transmission has a respective input shaft and the two sub-transmissions have an output shaft, which is axis-parallel to the input shafts. The mutually coaxial input shafts can each be activated via a power-shift clutch in alternation and the even forward gears are associated with the first sub-transmission and the odd forward gears are associated with the second sub-transmission, which can be engaged when a gear shift occurs via the shift element.

17 Claims, 2 Drawing Sheets

(52) U.S. Cl.
CPC ............... *F16H 2003/0818* (2013.01); *F16H 2003/0822* (2013.01); *F16H 2003/0826* (2013.01); *F16H 2200/0078* (2013.01)

(56) References Cited

U.S. PATENT DOCUMENTS

2018/0017135 A1* 1/2018 Hummel ................. F16H 3/006
2018/0266553 A1* 9/2018 Slapak ................ F16H 61/0403
2018/0283502 A1* 10/2018 Hummel ................. F16H 3/089

FOREIGN PATENT DOCUMENTS

| DE | 10 2011 089 167 A1 | 6/2013 | | |
|----|---|---|---|---|
| DE | 10 2012 013 248 A1 | 1/2014 | | |
| DE | 10 2012 217 512 A1 | 3/2014 | | |
| DE | 10 2012 221 149 A1 | 5/2014 | | |
| DE | 102014004691 A1 * | 10/2015 | ............. | F16H 3/006 |
| JP | 2014-31857 A | 2/2014 | | |
| WO | WO-2016131522 A1 * | 8/2016 | ............. | F16H 3/006 |

OTHER PUBLICATIONS

Notification of Transmittal of Translation of the International Preliminary Report on Patentability dated Aug. 24, 2017, in connection with corresponding international application No. PCT/EP2016/051115 (20 pages).
International Search Report and Written Opinion dated May 4, 2016 of corresponding International application No. PCT/EP2016/051115; 22 pgs.
International Preliminary Report on Patentability dated Jun. 8, 2017 of corresponding International application No. PCT/EP2016/051115; 21 pgs.

* cited by examiner

Fig. 2

| G | K1 | K2 | RE-1 | RE-2 | RE-3 | RE-4 | RE-5 | RE-6 | RE-7 | RE-8 | SE-A | SE-B | SE-C | SE-D | SE-E | SE-F |
|---|----|----|------|------|------|------|------|------|------|------|------|------|------|------|------|------|
| 1 | X  |    |      |      |      |      | X    |      | X    | X    | re   | III  |      |      |      |      |
| 1 |    | X  | X    | X    |      |      | X    |      |      |      |      |      | III  | re   |      | re   |
| 2 |    | X  | X    | X    |      |      |      |      |      |      | III  | III  |      |      |      |      |
| 3 | X  |    |      |      | X    |      |      |      |      |      |      |      | re   | re   |      |      |
| 3 |    | X  |      | X    | X    |      |      |      |      |      |      |      | re   |      |      |      |
| 4 |    | X  |      |      |      |      | X    |      |      |      | re   |      |      |      |      |      |
| 5 | X  |    | X    |      |      |      |      |      | X    |      |      |      | III  |      |      |      |
| 6 | X  |    |      | X    |      |      |      |      | X    |      | III  |      | re   |      |      |      |
| 7 |    | X  |      |      |      |      |      |      |      | X    | re   |      |      |      | III  | III  |
| 8 | X  |    |      | X    |      |      |      |      | X    | X    |      |      | III  |      |      |      |
| 9 |    | X  |      |      |      | X    |      | X    |      |      | re   | re   |      | III  |      |      |
| 10| X  |    |      |      |      |      |      | X    |      |      |      |      | III  |      | III  | III  |
| 11|    | X  |      |      |      | X    |      |      |      |      | III  | re   |      | III  |      |      |
| 12|    | X  |      |      |      |      |      |      |      |      |      |      | re   |      |      | III  |

DUAL CLUTCH TRANSMISSION FOR A MOTOR VEHICLE

FIELD

The present invention relates to a dual clutch transmission for a motor vehicle.

BACKGROUND

Dual clutch transmissions of this type have, besides a good efficiency, the advantage that, among other things, they can be shifted or engaged automatically, in particular, without interruption of the tractive force, wherein, in the respectively non-activated sub-transmission, a gear step can already be preselected and then activated by changing the power-shift clutches. In the process, the odd gears (1, 3, 5, etc.) in one sub-transmission and the even gears (2, 4, 6, etc.) in the other sub-transmission are positioned by means of corresponding gear wheel sets, which are in driving connection with the respective input shaft or the output shaft via, for example, synchronous clutches.

The axial length of the dual clutch transmission depends on the number of gear wheel sets or wheel planes that are arranged in the dual clutch transmission in succession in the axial direction. Each of the wheel planes is made up of at least two fixed gear wheels and/or detached gear wheels. Arranged between the wheel planes are shift elements that, when actuated, enable the engagement of forward and reverse gears.

A dual clutch transmission of the generic type has gear wheel sets that can be engaged via shift elements and form exactly eight wheel planes. The wheel planes are each associated with a first sub-transmission and a second sub-transmission. Each of the sub-transmissions has a respective input shaft as well as a common output shaft. The mutually coaxial input shafts can be activated via a respective power-shift clutch in alternation, wherein the even forward gears are associated with the first sub-transmission and the odd forward gears are associated with the second sub-transmission and, when a shift of gear occurs, the two sub-transmissions can be engaged via the shift element. In the generic dual clutch transmission, each of the wheel planes has an input gear wheel, which is mounted detachably or in a torsionally resistant manner on the respective input shaft, and an output gear wheel, which is mounted detachably or in a torsionally resistant manner on the output shaft and meshes with the former gear wheel. Said gear wheels can be coupled to or decoupled from the input shaft or the output shaft by means of shift elements, with formation of forward gears.

SUMMARY OF THE DISCLOSURE

The object of the invention consists in providing a dual clutch transmission, which, given a design that is favorable in terms of construction, has greater degrees of freedom in terms of functionality (shifting strategy) and in terms of the gearing of the gear steps.

In accordance with the disclosure, the dual clutch transmission has, for engagement of the forward gears, exactly five shift elements SE-A to SE-D as well as SE-F, which can be engaged on both sides in the axial direction, and at least one shift element SE-E, SE-G, which can be engaged at one end. In this way, a compact transmission structure is obtained, in which, by use of the shift elements, preferably exactly 12 forward gears can be engaged. Of the total of five shift elements that can be engaged on both sides, preferably the four shift elements SE-A, SE-B, SE-D, SE-C are arranged together on the input axis of the two input shafts and one shift element SE-F is arranged on the output shaft. The shift element SE-E, which can be engaged at one end, and, under circumstances, also the shift element SE-G, which can be engaged at one end, can be arranged together on the output shaft. In an especially preferred transmission structure, two or at most three shift elements, namely, SE-F, SE-G, and SE-E, can be arranged on the output shaft.

Preferably, the transmission structure can be designed in such a way that, by use of the shift elements, a total of preferably 8 forward gears can each be engaged in as direct gears, for which, in the case of an activated sub-transmission, exactly [one] wheel plane is engaged in the flow of torque. In addition, it is preferably possible in the transmission structure to engage not only such direct gears, but also forward twist gears (in particular, 4 forward twist gears, namely, the 1st, 2nd, 9th, and 10th gear). For each of the twist gears in an activated sub-transmission, exactly three wheel planes, combined in series, are engaged in the flow of torque. Accordingly, the wheel planes form, in dual function, both direct forward gears and forward twist gears. No actual wheel plane is associated with the respective forward twist gear—in contrast to the direct forward gears—as a result of which, in spite of a plurality of engageable forward gears, the construction length of the transmission in the axial direction is reduced and, indeed, done so in comparison to a dual clutch transmission for which the 12 forward gears can be engaged solely as direct forward gears.

The transmission structure according to the invention can be designed in this case such that, for gear selection of the forward gears, preferably exactly two of the shift elements SE-A to SE-F can be actuated.

In a technical implementation, each input shaft of the dual clutch transmission has exactly one shift element that can be engaged on both sides (for example, a dual synchronous clutch). By means of the first shift element SE-C, the first input shaft can be coupled to or decoupled from the first to fourth wheel planes of the first sub-transmission. By means of the second shift element SE-A, in contrast, the second input shaft can be coupled to or decoupled from the fifth to eighth wheel planes of the second sub-transmission.

In this case, the two coaxial input shafts no longer bear fixed gear wheels, but solely the two first and second shift elements. As a result of this, the input shafts can be designed to use substantially less material in comparison to prior art. In addition, it is possible by means of the first and second shift elements SE-C and SE-A to decouple wheel planes in the respectively activated sub-transmission at least in part from the flow of torque (that is, idled), as a result of which the moment of inertia of the activated sub-transmission can be reduced. This leads in the case of a shifting operation to a shortening of shifting times or to a reduction of the energy required for the shifting operation.

The first shift element SE-C arranged in the first sub-transmission can be coupled either to a detached drive-side gear wheel of a first wheel plane, which is mounted on the first input shaft, or to a hollow shaft, which is mounted coaxially on the first input shaft. The drive-side hollow shaft, which is mounted rotatably on the first input shaft, can bear at least one and preferably two drive-side fixed gear wheels, which are each assigned to a second wheel plane and to a third wheel plane.

In a technical implementation, it is possible, in addition, for a drive-side gear wheel of a fourth wheel plane to be mounted detachably on the drive-side hollow shaft of the first sub-transmission. The drive-side gear wheel of the fourth wheel plane can be coupled via a third shift element SE-D to the hollow shaft.

In an enhancement of the invention, a fifth wheel plane, which is directly adjacent to the first sub-transmission in the axial direction, is associated with the second sub-transmission. The fifth wheel plane can have a drive-side gear wheel, which is mounted rotatably on the second input shaft and preferably can be coupled by means of the above third shift element SE-D to the drive-side hollow shaft of the first sub-transmission. In this way, the fifth wheel plane can be engaged either on the first sub-transmission or on the second sub-transmission.

As mentioned above, the second input shaft can likewise bear exactly one second shift element SE-A, which, for example, is designed as a dual synchronous clutch. In this case, a respective drive-side detached gear wheel of an eighth wheel plane, which is mounted on the second input shaft, and a drive-side hollow shaft, which is coaxially mounted on the second input shaft, can be arranged respectively in the axial direction on both sides of the second shift element in the second sub-transmission. The drive-side hollow shaft and the above detached gear wheel of the eighth wheel plane can be coupled (via the second shift element SE-A) in alternation to the second input shaft. The drive-side hollow shaft of the second sub-transmission can preferably bear a drive-side fixed gear wheel of the seventh wheel plane as well as a drive-side detached gear wheel of the sixth wheel plane. For engagement of the drive-side detached gear wheel of the sixth wheel plane, the drive-side hollow shaft can have a fourth shift element SE-B, via which the drive-side gear wheel of the sixth wheel plane, which is detachably mounted, can coupled to the hollow shaft in the second sub-transmission. In a preferred implementation variant, it is possible by means of the above fourth shift element SE-B to couple, in addition, also the drive-side, detachably mounted gear wheel of the fifth wheel plane, which can be engaged on both transmissions, to the drive-side hollow shaft of the second sub-transmission.

In a technical implementation, the output shaft is arranged axis-parallel to the input shaft. Preferably, the output-side gear wheels of the first and second wheel planes in the first sub-transmission can be arranged in a torsionally resistant manner on a hollow shaft, which is coaxially mounted rotatably on the output shaft. The output shaft can have, in addition, a fifth shift element SE-F, by means of which, in the first sub-transmission in alternation, the hollow shaft or an output-side gear wheel of the third wheel plane can be coupled to the output shaft.

In a similar way as in the first sub-transmission, it is also possible in the second sub-transmission, to arrange the output-side gear wheels of the seventh and eighth wheel plane in a torsionally resistant manner on an output-side hollow shaft, which is coaxially mounted rotatably on the output shaft. The hollow shaft mounted rotatably on the output shaft in the second sub-transmission can be coupled by use of a sixth, one-end shift element SE-E to the output shaft.

In an implementation variant, the output-side gear wheel of the fifth wheel plane, which can be engaged on both sub-transmissions, is arranged as a fixed gear wheel on the output shaft in a torsionally resistant manner. In this case, in driving operation, the fifth wheel plane would co-rotate at all times and, under circumstances, cause premature wear to the rotary bearing. Against this background, the output-side gear wheel of the fifth wheel plane can also be mounted detachably on the output shaft and can be coupled via a seventh shift element SE-G to the output shaft.

As mentioned above, at least one gear wheel set, that is, the fifth wheel plane, of the one sub-transmission, can be coupled via a shift element to the other sub-transmission. As a result of this, it is possible with little added expense and effort in terms of transmission engineering and without dispensing with the advantage of acceleration of the motor vehicle without interruption of tractive force to skip at least one forward gear, that is, for example, to shift from an odd forward gear to the next odd forward gear without any delay. In particular in the case of strong motorization of the motor vehicle and in the case of defined driving conditions, this can enable an improved acceleration, occurring without any shifting delays, and, under circumstances, an improved efficiency in driving operation.

Especially preferably, the gear wheel set can form at least the 3rd forward gear of the sub-transmission, which can be connected in driving operation indirectly or directly optionally to the input shaft of the one or the other sub-transmission A, B. Resulting from this, besides the normal shifting strategy, is a variant in which it is possible to shift from the 1st gear to the 3rd gear and, as needed, from the latter to the 5th gear without interruption of the tractive force.

If, in the case of a corresponding gearing of said gear wheel set, said gear wheel set is also incorporated into the flow of power of the 1st forward gear, then, here, too, it is possible to switch the sub-transmission, as a result of which an additional degree of freedom in terms of functionality is created. then, here, too, it is possible to switch the sub-transmission, as a result of which an additional degree of freedom in terms of functionality is created.

In a preferred embodiment of the invention, the fixed gear wheel of the gear wheel set that can be engaged on the two sub-transmissions can be arranged on the common output shaft of the change-speed transmission, while the corresponding, engageable detached gear wheel can be coupled in a simple manner in terms of control engineering to the shift element SE-D of the sub-transmission A or to the shift element SE-B of the sub-transmission B. In this case, the shift elements can be dual clutches, by means of which a gear wheel set of the one sub-transmission or the gear wheel set of the other sub-transmission can be engaged.

In an advantageous enhancement of the invention, it is possible in the case of a 12-gear transmission to use only eight wheel planes by multiply using the gear wheel sets, wherein the commonly used gear wheel set of the one sub-transmission is arranged directly adjacent to the other sub-transmission. The change-speed transmission can accordingly be relatively short in construction and can be designed with the least possible number of shift elements and gear selectors.

Furthermore, it is possible to this end to fasten fixed gear wheels of a plurality of gear wheel or wheel planes of the two sub-transmissions on respectively common hollow shafts and for these to be mounted rotatably on the common output shaft as well as, via shifting clutches (that is, shift elements), to the output shaft.

Additional fixed gear wheels of the wheel planes can further be arranged on a hollow shaft, which is mounted on the input shaft of the one sub-transmission and which can be coupled by means of a shifting clutch to said gear wheel set of the other sub-transmission.

Finally, it is possible with the least possible expense and effort in terms of transmission engineering to enable the twelve forward gears to be shifted by means of five dual clutches and a single clutch, wherein four dual clutches are positioned on the coaxially arranged two input shafts of the sub-transmissions and one dual clutch as well as a single clutch are arranged on the common output shaft.

BRIEF DESCRIPTION OF THE DRAWINGS

An exemplary embodiment of the invention is described below in detail on the basis of the appended drawing. Shown are:

FIG. 2 a shift matrix of the change-speed transmission in accordance with FIG. 1.

DETAILED DESCRIPTION

Figure 1:
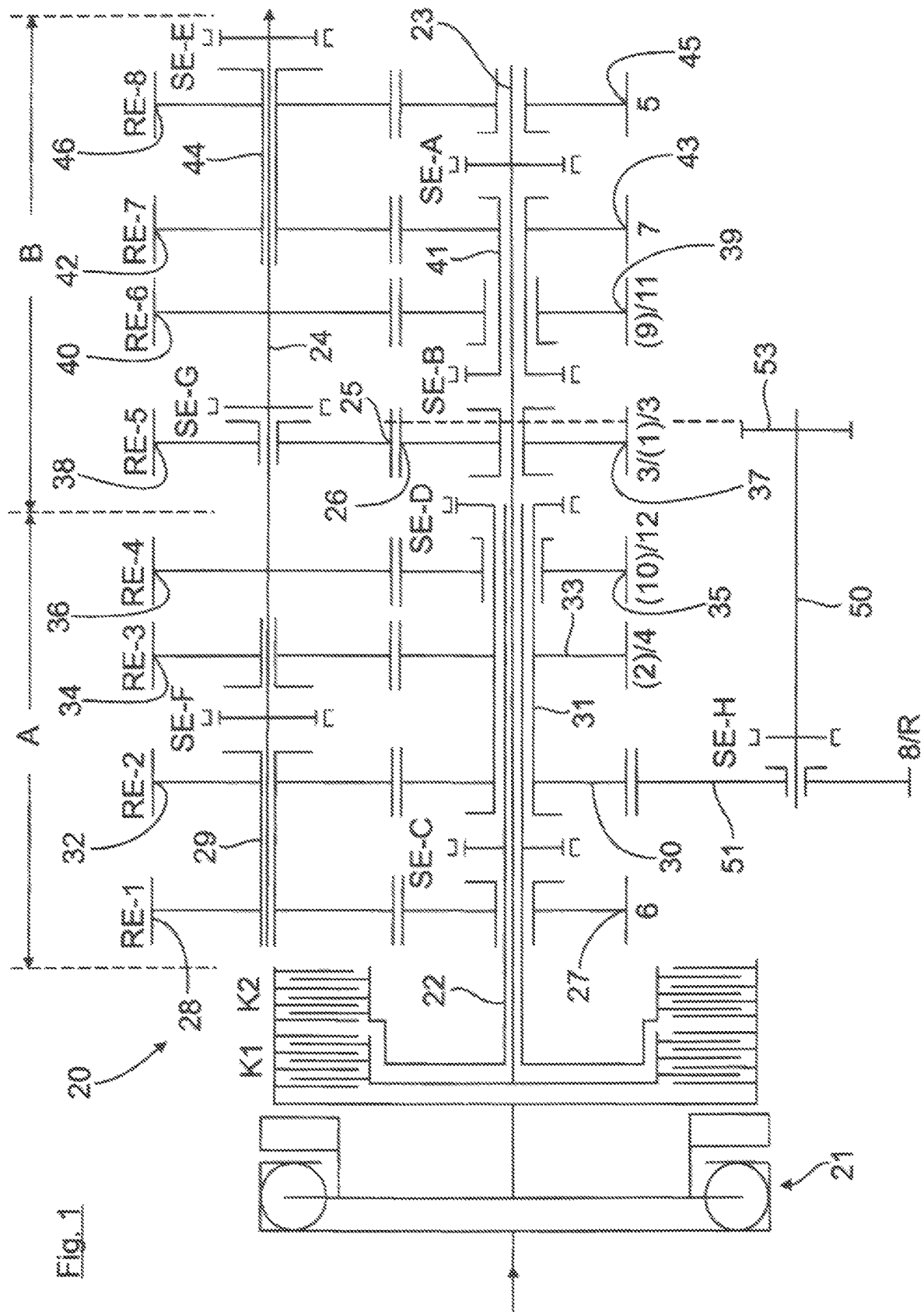
FIG. 1 as block connection diagram, a change-speed transmission for motor vehicles with two sub-transmissions, which can be activated via two power-shift clutches and which have 12 engageable forward gears, wherein a gear wheel set of the transmission can be used for both sub-transmissions.

The FIG. 1 shows a change-speed transmission or a dual clutch transmission 20 for a motor vehicle, by means of which up to twelve forward gears 1 to 12 can be engaged in eight wheel planes or with eight gear wheel sets RE-1 to RE-8. Each of the wheel planes RE-1 to RE-8 is formed from a drive-side gear wheel coaxial to the input shaft 22, 23 and an output-side gear wheel coaxial to the output shaft 24.

The change-speed transmission 20 has two input shafts 22, 23, which are in driving connection with, for example, an internal combustion engine (not illustrated) and a torsional vibration damper 21 and can be coupled via two power-shift clutches K1, K2, the input shaft 22 of which is a hollow shaft, through which the second input shaft 23 passes. The rotary bearing and the corresponding transmission housing are not illustrated.

The gear wheel sets or wheel planes RE-1 to RE-8 are arranged in a way that is known as such by way of engageable detached gear wheels and by way of fixed gear wheels on the input shafts 22, 23 and on a common output shaft 24 in a way that remains to be described, wherein the gear wheel sets RE-1 to RE-4 form a first sub-transmission A and the gear wheel sets RE-5 to RE-8 form a second sub-transmission B.

The gear wheel set RE-5 of the sub-transmission B is arranged with a fixed gear wheel 38 on the output shaft 24 and with an engageable detached gear wheel 26 on the input shaft 23 axially directly adjacent to the sub-transmission A in such a way that the detached gear wheel 27 thereof can be coupled via a shifting clutch SE-D either to the sub-transmission A or via a shifting clutch SE-B to the sub-transmission B.

The arrangement of the other gear wheel sets is such that the 12 forward gears can be realized for only eight gear wheel sets RE-1 to RE-8, wherein:

the detached gear wheel 27 of RE-1 is arranged on the input shaft 22 and the fixed gear wheel 28 thereof is arranged on a hollow shaft 29, which is coaxially mounted with respect to the output shaft 24, in a torsionally resistant manner;

a fixed gear wheel 30 of RE-2 is mounted via a hollow shaft 31 on the input shaft 22 and the corresponding fixed gear wheel 32 is also arranged on the hollow shaft 29 in a torsionally resistant manner;

the detached gear wheel 27 and the hollow shaft 31 can be coupled by means of a shifting clutch SE-C in alternation to the input shaft 22;

a fixed gear wheel 33 of RE-3 is arranged on the hollow shaft 31, while the detached gear wheel 34 thereof or the hollow shaft 29 can be coupled in alternation via a shifting clutch SE-F to the output shaft 24;

further mounted on the hollow shaft 31 is a detached gear wheel 35 of the gear wheel set RE-4, which meshes with a fixed gear wheel 36 on the output shaft 24;

directly axially adjacent to the detached gear wheel 35 of the gear wheel set RE-4, the detached gear wheel 37 of the gear wheel set RE-5 is mounted on the central input shaft 23 of the sub-transmission B, which engages with the further fixed gear wheel 38 on the output shaft 24;

the two detached gear wheels 35, 37 can be coupled via a further shifting clutch SE-D in alternation to the hollow shaft 31 on the input shaft 22;

in addition, the detached gear wheel 37 can be coupled via a second shifting clutch SE-B to a hollow shaft 41, which is mounted on the input shaft 23, wherein the hollow shaft 41 bears a detached gear wheel 39 of the gear wheel set RE-6, which likewise can be coupled via the shifting clutch SE-B to the hollow shaft 41;

the detached gear wheel 39 of the gear wheel set RE-6 meshes with a further fixed gear wheel 40 on the output shaft 24;

the hollow shaft 41 further has a fixed gear wheel 43 of the gear wheel set RE-7, which engages with a fixed gear wheel 42 on a hollow shaft 44, which is mounted rotatably on the output shaft 24;

the hollow shaft 41 on the input shaft 23 can further be connected via a shifting clutch SE-A to the input shaft 23, wherein the shifting clutch SE-A also couples a detached gear wheel 45 of the gear wheel set RE-8 in alternation to the input shaft 23;

the fixed gear wheel 46 of the gear wheel set RE-8 is arranged, in analogy to the fixed gear wheel 42 of RE-7, on the hollow shaft 44, wherein the hollow shaft 44 can be connected via a single shifting clutch SE-E to the output shaft 24.

The shifting clutches SE-C, SE-F, SE-D, SE-B, and SE-A can be designed as known dual synchronous clutches (with a positioning of the control sleeves thereof in the drawing of FIG. 1 to the left (li) or to the right (re) and the shifting clutch SE-E as a single synchronous clutch (shifting position li), which are conventional in shifting transmissions and are shifted from a neutral position (as drawn) under electronic control via corresponding electrically/hydraulically operated actuators.

The clutches K1, K2 can be hydraulically power-shift ed plate clutches, which, in alternation, operate the sub-transmission A or B after corresponding preselection of the gears in the flow of driving force.

The forward gears 1 to 12 (a possibly required reverse gear is not drawn for simplicity) can be engaged in accordance with the shift matrix in FIG. 2, wherein the respectively shifted gear (G) 1 to 12 is given in the left column of the matrix. The crosses (X) identify the gear wheel sets RE1 to RE8 incorporated in the respective power flow and the indication (li, left) or (re, right) gives the shifting position of the respective shifting clutches SE. It is to be noted that the gears 1 and 3 in the column G are given twice, because they can be engaged optionally via the sub-transmission B (clutch K1) or the sub-transmission A (clutch K2).

In accordance therewith, the normal shifting sequence can be 1-2-3-4-5 ff., wherein the 1st gear is engaged via the clutch K1 (sub-transmission B) and the further gears are engaged through closing of the clutches K2, K1, K2, etc. in alternation. In the sub-transmission with the open clutch, it is possible, as is known, to preselect the next gear, as a result of which, through shifting of the clutches K1, K2, it is possible to shift without interruption of the tractive force.

In the modified shifting sequence, the 2nd gear and, under circumstances, also the 4th gear are skipped without interruption of the tractive force, wherein the flow of force in the 1st gear is controlled via the clutch K1 or K2 (sub-transmission A or B) with corresponding incorporation of the gear wheel sets RE-1 to RE-8 and positioning of the shifting clutch SE (see matrix). It results from this that respectively the 3rd gear and, under circumstances, the 5th gear are already preselected and can be activated by switching the power-shift clutch without interruption of the tractive force.

Accordingly, it is possible to control, besides the normal shifting sequence of the dual clutch transmission 20, the modified shifting sequences 1-3-4-5-6 ff. in the order K2, K1, K2, K1, K2 ff. or 1-3-5-6, ff. in the order K1, K2, K1, K2 ff., wherein the shifting sequences can be predetermined via an electronic transmission control and/or can be adjusted manually depending on the operating data and driving parameters of the motor vehicle.

As ensues from the shift matrix of FIG. 2, the forward gears 3 to 8 as well as 11 and 12 are geared as direct gears, which, respectively, have exactly one engaged wheel plane in the flow of torque. In contrast to this, the forward gears 1, 2, and 9 as well as 10 are realized not as direct gears, but as twist gears, in which, by means of the shift elements SE-A to SE-G, respectively exactly three wheel planes, combined in series, are engaged in the flow of torque. By way of example, in the first forward gear (twist gear) the eighth, seventh, and fifth wheel planes RE-8, RE-7, and RE-5 are engaged in the flow of torque. In the 2nd forward gear (twist gear), the first, second, and third wheel planes RE-1, RE-2, RE-3 are engaged in the flow of torque. In the ninth forward gear (twist gear), the eighth, seventh, and sixth wheel planes RE-8, RE-7, RE-6 are engaged. When the 10th forward gear (twist gear) is engaged, the first, second, and fourth wheel planes RE-1, RE-2, and RE-4 are engaged.

For provision of the respective forward twist gears 1, 2, and 9 as well as 10, the three wheel planes to be engaged are associated either completely with the first sub-transmission A or completely with the second sub-transmission B. This means that, in the case of an engaged forward twist gear, only the sub-transmission having the three twist wheel planes is incorporated in the flow of torque of the engaged gear, whereas the other sub-transmission is decoupled in full from the flow of torque.

For formation of a reverse gear R, a reverse gear shaft 50, which bridges the two sub-transmissions A, B, is mounted in the transmission housing (not illustrated) of the dual clutch transmission axis-parallel to the input shafts 22, 23 and to the output shaft 24. The reverse gear shaft 50 bears two reversing gears 51, 53, the first reversing gear 51 of which meshes with the drive-side gear 30 of the second wheel plane RE-2 and the second reversing gear 53 meshes with the drive-side gear 37 of the fifth wheel plane RE-5.

The first reversing gear 51, which interacts with the second wheel plane RE-2 of the sub-transmission A, is designed as a detached gear wheel and can be coupled to the reverse gear shaft 50 by means of a shift element SE-H, which can be engaged at one end. The reversing gear 53, which interacts with the fifth wheel plane RE-5, is designed, by contrast, as a fixed gear wheel.

The reverse gear R is activated by shifting the shift element borne by the first input shaft 22 in of FIG. 1 to the left on the drive-side gear wheel 30 of the first wheel plane RE-1. In addition, the shift element SE-H is shifted to the left on the first reversing gear 51 and the output-side gear 38 of the intermediate wheel plane RE-5 is coupled via the shift element SE-G to the output shaft 24. Therefore, the reverse gear R is a twist gear, wherein, when the separating clutch K2 is closed, the flow of torque passes via the hollow input shaft 22 and the drive-side gear 30 of the second wheel plane RE-2 to the first reversing gear 51 and further, via the reverse gear shaft 50 as well as the second reversing gear 53, to the output-side gear 38 of the intermediate wheel plane RE-5.

The invention claimed is:

1. A dual clutch transmission for a motor vehicle comprising:
gear wheel sets, which can be engaged via shift elements and which form exactly eight wheel planes, which are arranged in succession in axial direction from the input side to the output side of the dual clutch transmission in the sequence first to eighth wheel plane, which are associated, respectively, with a first sub-transmission and a second sub-transmission, the first sub-transmission of which has a first input shaft and the second sub-transmission has a second input shaft and the two sub-transmissions have a common output shaft, which is axis-parallel to the input shafts, wherein the mutually coaxial input shafts can each be activated in alternation via a power-shift clutch, and the even forward gears are associated with the first sub-transmission, a lowest two odd forward gears are associated with either the first sub-transmission or the second sub-transmission, and the odd forward gears above the lowest two odd forward gears are associated with the second sub-transmission, which can be engaged when a gear shift occurs via the shift elements, wherein each of the wheel planes has a drive gear wheel, which is mounted detachably or in a torsionally resistant manner on the respective input shaft, and an output-side gear wheel, which is mounted detachably or in torsionally resistant manner on the output shaft and meshes with the former gear wheel, which, by means of shift elements, can be coupled to the respective input shaft and to the output shaft, or decoupled therefrom, with the formation of forward gears, for engagement of the forward gears, the dual clutch transmission has exactly five shift elements, which can be engaged on both sides in an axial direction, and at least one shift element that can be engaged on one side;
wherein by the shift elements, exactly 12 forward gears can be engaged, and of the five shift elements that can be engaged on both sides, four shift elements are arranged on the input axis of the input shafts and one shift element, which can be engaged on both sides is arranged on the output shaft, and in that the shift element, which can be engaged on one side, is arranged on the output shaft.

2. The dual clutch transmission according to claim 1, wherein at least two, and at most three, shift elements are arranged on the output shaft.

3. The dual clutch transmission according to claim 1, wherein the forward gears, can be engaged by the first to seventh shift elements, respectively, as direct gears, for which, in the activated sub-transmission of the first or second sub-transmission, exactly one wheel plane is engaged in the flow of torque, and the forward gears, can be engaged by the first to seventh shift elements, respectively, as twist gears, for which, in the activated first or second sub-transmission, exactly three wheel planes are combined in series and engaged in the flow of torque.

4. The dual clutch transmission according to claim 1, for engagement of the forward gears, at least two of the shift elements can be actuated.

5. The dual clutch transmission according to claim 1, wherein the input shafts are free of wheel planes arranged thereon in a torsionally resistant manner, and each input shaft has exactly one shift element that can be engaged on both sides in axial direction, and by the first shift element, the first input shaft can be coupled to, or decoupled from, the first to fourth wheel planes of the first sub-transmission, and by the second shift element, the second input shaft can be coupled to, or decoupled from, the fifth to eighth wheel planes of the second sub-transmission.

6. The dual clutch transmission according to claim 5, wherein a respective drive-side detached gear wheel of the first wheel plane, which is mounted on the first input shaft, and a drive-side hollow shaft of the first sub-transmission, which is coaxially mounted on the first input shaft, are arranged on both sides of the first shift element in the axial direction, and can be coupled in alternation to the first input shaft via the first shift element, and in that the drive-side hollow shaft of the first sub-transmission bears a fixed gear wheel of the second wheel plane and a fixed gear wheel of the third wheel plane.

7. The dual clutch transmission according to claim 6, wherein a drive-side gear wheel of the fourth wheel plane is detachably mounted on the drive-side hollow shaft of the first sub-transmission, and the drive-side hollow shaft can be coupled via the third shift element to the detachably mounted drive-side gear wheel of the fourth wheel plane.

8. The dual clutch transmission according to claim 7, wherein the second sub-transmission has the fifth wheel plane, which is directly adjacent to the first sub-transmission in axial direction, and the fifth wheel plane can be coupled by the third shift element to the first sub-transmission.

9. The dual clutch transmission according to claim 8, wherein the fifth wheel plane, which can be engaged on both sub-transmissions, is detachably mounted with its drive-side gear wheel on the second input shaft and can be coupled by means of the third shift element to the drive-side hollow shaft of the first sub-transmission.

10. The dual clutch transmission according to claim 5, wherein, respectively, a drive-side detached gear wheel of the eighth wheel plane, which is mounted on the second input shaft, and a drive-side hollow shaft, which is coaxially mounted on the second input shaft, are arranged on both sides of the second shift element of the second sub-transmission in the axial direction, and the detached gear wheel of the eighth wheel plane and the drive-side hollow shaft of the second sub-transmission can be coupled in alternation to the second input shaft via the second shift element, and the drive-side hollow shaft of the second sub-transmission bears at least one fixed gear wheel of the seventh wheel plane.

11. The dual clutch transmission according to claim 10, wherein a drive-side gear wheel of the sixth wheel plane is detachably mounted on the drive-side hollow shaft of the second sub-transmission, and in that the drive-side hollow shaft of the second sub-transmission has a fourth shift element, with which the detachably mounted drive-side gear wheel of the sixth wheel plane can be coupled to the drive-side hollow shaft of the second sub-transmission.

12. The dual clutch transmission according to claim 11, wherein the drive-side gear wheel of the fifth wheel plane, which can be engaged on both sub-transmissions, can be coupled to the second sub-transmission by means of the fourth shift element.

13. The dual clutch transmission according to claim 1, wherein the output-side gear wheels of the first and second wheel planes of the first sub-transmission are arranged in a torsionally resistant manner on an output-side hollow shaft of the first sub-transmission, which is coaxially and rotatably mounted on the output shaft.

14. The dual clutch transmission according to claim 13, wherein the output shaft has the fifth shift element, by means of which, in the first sub-transmission, in alternation, the output-side hollow shaft or an output-side gear wheel of the third wheel plane can be coupled to the output shaft.

15. The dual clutch transmission according to claim 1, wherein the output-side gear wheels of the seventh and eighth wheel planes of the second sub-transmission are arranged in a torsionally resistant manner on an output-side hollow shaft of the second sub-transmission, which is coaxially and rotatably mounted on the output shaft.

16. The dual clutch transmission according to claim 15, wherein the output shaft has the sixth shift element, by which the output-side hollow shaft of the second sub-transmission can be coupled to the output shaft.

17. The dual clutch transmission according to claim 9, wherein the output-side gear wheel of the fifth wheel plane, which can be engaged on both sub-transmissions, is mounted detachably on the output shaft and can be coupled to the output shaft via a seventh shift element.

* * * * *